United States Patent
Lin et al.

(10) Patent No.: US 9,455,819 B2
(45) Date of Patent: Sep. 27, 2016

(54) METHOD, SYSTEM AND APPARATUS FOR SENDING AND RECEIVING FEEDBACK INFORMATION

(75) Inventors: Yanan Lin, Beijing (CN); Zukang Shen, Beijing (CN); Xuejuan Gao, Beijing (CN); Xueming Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 26 days.

(21) Appl. No.: 14/130,315

(22) PCT Filed: Mar. 26, 2012

(86) PCT No.: PCT/CN2012/073056
§ 371 (c)(1),
(2), (4) Date: Dec. 30, 2013

(87) PCT Pub. No.: WO2013/000299
PCT Pub. Date: Jan. 3, 2013

(65) Prior Publication Data
US 2014/0153451 A1 Jun. 5, 2014

(30) Foreign Application Priority Data

Jun. 30, 2011 (CN) .......................... 2011 1 0183359
Jul. 11, 2011 (CN) .......................... 2011 1 0192510

(51) Int. Cl.
*H04L 5/14* (2006.01)
*H04L 1/18* (2006.01)
(Continued)

(52) U.S. Cl.
CPC .............. *H04L 5/14* (2013.01); *H04L 1/1854* (2013.01); *H04L 5/0046* (2013.01); *H04L 1/04* (2013.01); *H04L 5/001* (2013.01); *H04L 5/0055* (2013.01)

(58) Field of Classification Search
None
See application file for complete search history.

(56) References Cited

U.S. PATENT DOCUMENTS

2010/0303035 A1* 12/2010 Gao et al. ................... 370/329
2010/0322173 A1 12/2010 Marinier et al.
(Continued)

FOREIGN PATENT DOCUMENTS

CN 101635987 A 1/2010
CN 102014496 A 4/2011
(Continued)

OTHER PUBLICATIONS

PCT International Search Report for PCT Counterpart Application No. PCT/CN2012/073056, 5 pgs. (including English translation), (Jul. 5, 2012).

(Continued)

*Primary Examiner* — Hassan Kizou
*Assistant Examiner* — Roberta A Shand
(74) *Attorney, Agent, or Firm* — Blakely, Sokoloff, Taylor & Zafman LLP (57) ABSTRACT

The present invention relates to the technical field of wireless communication, particularly relates to a method, system and apparatus for sending and receiving feedback information, to be used for transmitting the feedback information after the aggregation of carriers with different time division duplex (TDD) uplink and downlink configurations. The method of an embodiment of the present invention comprises: determining a dedicated feedback timing relationship by using a user equipment (UE) aggregating carriers with different TDD uplink/downlink configurations; the UE transmitting the feedback information corresponding to the downlink data on the primary carrier according to the determined dedicated feedback timing relationship. Because the feedback information can be transmitted after the aggregation of carriers with different TDD uplink and downlink configurations, thus the transmission efficiency and system performance after the aggregation of carriers with different TDD uplink and downlink configurations are improved.

11 Claims, 5 Drawing Sheets

(51) Int. Cl.
    *H04L 5/00*     (2006.01)
    *H04L 1/04*     (2006.01)

(56) References Cited

U.S. PATENT DOCUMENTS

| | | | | |
|---|---|---|---|---|
| 2011/0194443 | A1* | 8/2011 | Li et al. | 370/252 |
| 2011/0235554 | A1* | 9/2011 | Chen | 370/279 |
| 2011/0268048 | A1* | 11/2011 | Toskala et al. | 370/329 |
| 2011/0305213 | A1* | 12/2011 | Lohr et al. | 370/329 |
| 2013/0258914 | A1* | 10/2013 | Seo et al. | 370/280 |
| 2014/0016519 | A1* | 1/2014 | Kim et al. | 370/280 |
| 2014/0036738 | A1* | 2/2014 | Kim et al. | 370/280 |

FOREIGN PATENT DOCUMENTS

| | | |
|---|---|---|
| CN | 102025467 A | 4/2011 |
| CN | 102075309 A | 5/2011 |
| CN | 102083211 A | 6/2011 |
| CN | 102291227 A | 12/2011 |
| WO | WO 2010/123893 A1 | 10/2010 |
| WO | WO 2011/069378 A1 | 6/2011 |

OTHER PUBLICATIONS

PCT Written Opinion of the International Searching Authority for PCT Counterpart Application No. PCT/CN2012/073056, 12 pgs. (including English translation), (Jul. 5, 2012).

European Patent Office Communication enclosing Supplementary European Search Report for corresponding European Patent Application No. 12803955.9, 9 pages, (Jul. 11, 2014).

Nokia Siemens Networks, et al., "Cell Specific TDD Configuration with Inter-Band CA", 3GPP TSG-RAN WG2 Meeting #74, Draft No. R2-112946, Barcelona, Spain, 4 pages, (May 9-11, 2011).

Intel Corporation, "Support of Mixed Inter-Band TDD Configurations in Rel-11 CA", 3GPP TSG RAN2#74 Meeting, Draft No. R2-113216, Barcelona, Spain, 3 pages, (May 9-11, 2011).

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.2.0, 120 pages, (Jun. 2011).

PCT International Preliminary Report on Patentability for PCT Application No. PCT/CN2012/073056; issued on Jan. 1, 2014; 12 pgs.

*3GPP TS 36.213 v9.2.0*; (Jun. 2010); "$3^{rd}$ Generation Partnership Project; Technical Specification Group Radio Access Network; Evolved Universal Terrestrial Radio Access (E-UTRA); Physical layer Procedures (Release 9)." 80 pgs.

3GPP TS 36.213 v8.5.0; (Feb. 2009); $3^{rd}$ Generation Partnership Project; Technical Specification Group Radio Access Network; Evolved Universal Terrestrial Radio Access (E-UTRA); Physical layer Procedures (Release 8); 76pgs.

Office Action for corresponding Japanese Patent Application No. 2014-517402, 6 pp., (Aug. 25, 2015).

3GPP, "$3^{rd}$ Generation Partnership Project; Technical Specification Group Radio Access Network; Evolved Universal Terrestrial Radio Access (E-UTRA); Physical Layer Procedures (Release 8)", 3GPP TS 36.213 V8.8.0, 34 pp., (Sep. 2009).

Renesas Mobile Europe, "Operation Principles of CC Specific TDD Configuration", 3GPP TSG-RAN WG2 Meeting #74, R2-112938, Barcelona, France, 5 pp., (May 9-13, 2011).

* cited by examiner

METHOD, SYSTEM AND APPARATUS FOR SENDING AND RECEIVING FEEDBACK INFORMATION

CROSS-REFERENCE TO RELATED APPLICATIONS

This patent application is a U.S. National Stage under 35 U.S.C. §371 of International Application No. PCT/CN2012/073056, filed on Mar. 26, 2012, entitle METHOD, SYSTEM AND APPARATUS FOR SENDING AND RECEIVING FEEDBACK INFORMATION, designating the United States and claiming the benefit of Chinese Patent Application No. 201110183359.3, filed with the Chinese Patent Office on Jun. 30, 2011 and entitled "Method, system and apparatus for sending and receiving feedback information", which was incorporated by reference in its entirety, and the benefit of Chinese Patent Application No. 201110192510.X, filed with the Chinese Patent Office on Jul. 11, 2011 and entitled "Method, system and apparatus for sending and receiving feedback information."

FIELD OF THE INVENTION

The present invention relates to the field of wireless communication technologies and more particularly to a method, system and apparatus for sending and receiving feedback information.

BACKGROUND OF THE INVENTION

Figure 1A:
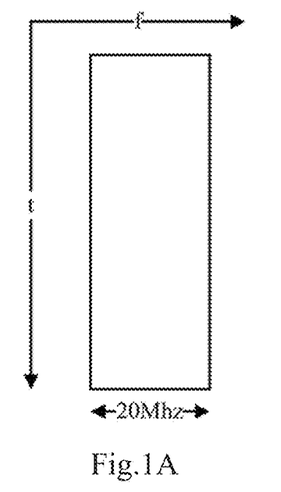
FIG. 1A is a schematic diagram of a single-band system in the prior art.

For an existing Long Term Evolution (LTE) system, only one carrier can be present in a cell and provided with the maximum bandwidth of 20 MHz, as illustrated in FIG. 1A.

For a Long Term Evolution-Advanced (LTE-A) system, there are significantly improved peak rates of the LTE-A system as compared with the LTE system. In particular, up to 1 Gbps in the downlink and 500 Mbps in the uplink are required for the LTE-A system. Apparently this demand has failed to be accommodated by the 20 MHz bandwidth. In order to enable the LTE-A system to comply with the requirement, the technology of Carrier Aggregation (CA) has been introduced, that is, a plurality of contiguous or non-contiguous carriers are aggregated together in the same cell to serve concurrently a user equipment if necessary to thereby provide a desired rate. Thus the LTE-A system is a multi-carrier system. In order to ensure the user equipment of the LTE-A system to be capable of operating on each aggregated carrier, there is no more than 20 MHz per carrier. The CA technology of the LTE-A is as illustrated in FIG. 1B.

Figure 1B:
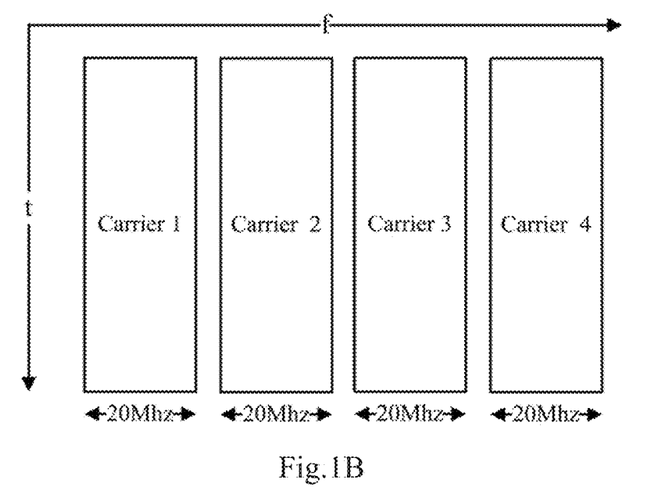
FIG. 1B is a schematic diagram of a system with aggregated bands in the prior art.

In the LTE-A system in FIG. 1B, 4 carriers are aggregated. A base station can transmit data to the user equipment concurrently on the 4 carriers to improve the throughput of the system.

For the LTE TDD system, the User Equipment (UE) may feed back, in an uplink subframe, Acknowledgment/Non-Acknowledgement (ACK/NACK) information corresponding to a plurality of downlink subframes, that is, the UE feeds signaling (i.e., ACK/NACK) in an uplink subframe n back to the base station regarding whether data in a downlink subframe n−k needs to be retransmitted after demodulating and decoding the data in the downlink subframe, where k∈K, and the values of the set K depend upon an uplink-downlink configuration of the system and a particular subframe number, particularly as depicted in Table 1.

TABLE 1

| Uplink-downlink configuration | Uplink feedback specified for downlink transmission Subframe number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 6, 4 | — | — | — | — | 8, 7, 6, 4 | — | — |
| 3 | — | — | 11, 7, 6 | 6, 5 | 5, 4 | — | — | — | — | — |
| 4 | — | — | 12, 11, 8, 7 | 7, 6, 5, 4 | — | — | — | — | — | — |
| 5 | — | — | 13, 12, 11, 9, 8, 7, 6, 5, 4 | — | — | — | — | — | — | — |
| 6 | — | — | 7 | 7 | 5 | — | — | 7 | 7 | — |

A plurality of radio frames are arranged in sequence, that is, if the last subframe in a radio frame a is k, then the first subframe in a radio frame a+1 is k+1, and Table 1 depicts K corresponding to each uplink subframe taking only a radio frame as an example, where n−k<0 indicates a downlink subframe in a previous radio frame.

Figure 1C:
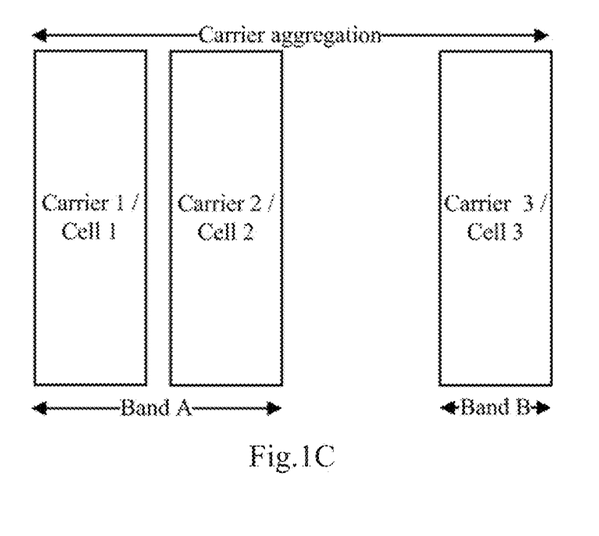
FIG. 1C is a schematic diagram of different TDD uplink-downlink configurations for different bands in the prior art.

In a system of the LTE Rel-11 or later, in order to avoid interference with another Time Division Duplex (TDD) system, different TDD uplink-downlink configurations may be used for LTE cells in different bands, as illustrated in FIG. 1C, where a carrier 1 and a carrier 2 operate in a band A, and a carrier 3 operates in a band B, and a cell 1, a cell 2 and a cell 3 are cells respectively over the carrier 1, the carrier 2 and the carrier 3. There are identical TDD uplink-downlink configurations of the cell 1 and the cell 2, both of which are the uplink-downlink configuration 1, and a TDD uplink-downlink configuration of the cell 3, which is the uplink-downlink configuration 2, is different from those of the cell 1 and the cell 2. If these three cells are desired to be carrier-aggregated for the UE, then more than one TDD uplink-downlink configuration will be present across all the aggregated cells of the UE.

There has been absent so far of a solution to transmission of feedback information following aggregation of carriers with different TDD uplink-downlink configurations.

SUMMARY OF THE INVENTION

Embodiments of the invention provide a method, system and apparatus for sending and receiving feedback information so as to transmit feedback information following aggregation of carriers with different TDD uplink-downlink configurations.

A method of sending feedback information according to an embodiment of the invention includes steps of:

determining, by a user equipment, a dedicated feedback timing; and sending, by the user equipment, feedback information, corresponding to downlink data, on a primary carrier according to the determined dedicated feedback timing, wherein the user equipment is a user equipment which is configured with carrier aggregation with different TDD uplink-downlink configurations.

A method of receiving feedback information according to an embodiment of the invention includes steps of:

determining, by a network-side apparatus, a dedicated feedback timing; and receiving, by the network-side apparatus, feedback information from a user equipment on a primary carrier of the user equipment according to the determined dedicated feedback timing, wherein the user equipment is a user equipment which is configured with carrier aggregation with different TDD uplink-downlink configurations.

An apparatus for sending feedback information according to an embodiment of the invention, which is configured with carrier aggregation with different TDD uplink-downlink configurations, includes:

a first timing determining module configured to determine a dedicated feedback timing; and a sending module configured to send feedback information, corresponding to downlink data, on a primary carrier according to the determined dedicated feedback timing An apparatus for receiving feedback information according to an embodiment of the invention includes:

a second timing determining module configured to determine a dedicated feedback timing; and a receiving module configured to receive feedback information from a user equipment on a primary carrier of the user equipment according to the determined dedicated feedback timing, wherein the user equipment is a user equipment which is configured with carrier aggregation with different TDD uplink-downlink configurations.

A system for transmitting feedback information according to an embodiment of the invention includes:

a user equipment, which is configured with carrier aggregation with different TDD uplink-downlink configurations, configured to determine a dedicated feedback timing and to send feedback information, corresponding to downlink data, on a primary carrier according to the determined dedicated feedback timing.

a network-side apparatus configured to determine a dedicated feedback timing and to receive the feedback information from the user equipment, which is configured with carrier aggregation with different TDD uplink-downlink configurations, on the primary carrier of the user equipment according to the determined dedicated feedback timing Since feedback information is enabled to be transmitted following aggregation of carriers with different TDD uplink-downlink configurations, the transmission efficiency and the system performance following aggregation of the carriers with the different TDD uplink-downlink configurations can be improved.

DETAILED DESCRIPTION OF THE EMBODIMENTS

In embodiments of the invention, a user equipment which is configured with carrier aggregation with different TDD uplink-downlink configurations sends feedback information, corresponding to downlink data, on a primary carrier according to a dedicated feedback timing. Since feedback information is enabled to be transmitted following aggregation of carriers with different TDD uplink-downlink configurations, the transmission efficiency and the system performance following aggregation of the carriers with the different TDD uplink-downlink configurations can be improved.

The carriers aggregated for the user equipment includes the primary carrier in PCell and secondary carriers in SCells:

For the primary carrier, only one carrier in a plurality of cells aggregated for the user equipment is defined as the primary cell which is selected by a base station and configured for the user equipment in Radio Resource Control (RRC) signaling. A Physical Uplink Control Channel (PUCCH) is configured only on the primary carrier; and For the secondary carriers, the other carriers with all the cells aggregated for the user equipment than the primary carrier are secondary carriers.

Where the dedicated feedback timing is a feedback sending timing used specifically for a user equipment which is configured with carrier aggregation with different TDD uplink-downlink configurations.

The user equipment to be introduced below will refer to a user equipment which is configured with carrier aggregation with different TDD uplink-downlink configurations unless stated otherwise, so a repeated description thereof will be omitted.

In the following description, firstly an implementation with cooperation of the network side and the user equipment side will be described, and finally implementations at the network side and at the user equipment side will be described respectively, but this will not suggest required cooperation of both the sides for an implementation, and in fact, problems present respectively at the network side and at the user equipment side will also be addressed in the separate implementations at the network side and at the user equipment side although a better technical effect can be achieved in the implementation with cooperation of both the sides.

The embodiments of the invention will be further described below in details with reference to the drawings.

Figure 2:
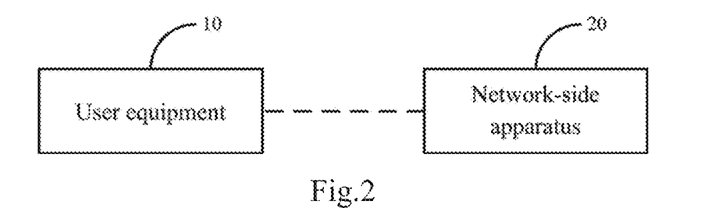
FIG. 2 is a schematic structural diagram of a system for transmitting feedback information according to an embodiment of the invention.

As illustrated in FIG. 2, a system for transmitting feedback information according to an embodiment of the invention includes a user equipment 10 which is configured with carrier aggregation with different TDD uplink-downlink configurations and a network-side apparatus 20.

The user equipment 10 which is configured with carrier aggregation with different TDD uplink-downlink configurations is configured to determine a dedicated feedback timing and to send feedback information, corresponding to downlink data, on a primary carrier according to the determined dedicated feedback timing.

The network-side apparatus 20 is configured to determine a dedicated feedback timing and to receive the feedback information from the user equipment, which is configured with carrier aggregation with different TDD uplink-downlink configurations, on the primary carrier of the user equipment according to the determined dedicated feedback timing Where the downlink data includes but will not be limited to at least one of the following data:

A dynamically scheduled Physical Downlink Shared Channel (PDSCH), a semi-dynamically scheduled PDSCH, and a Physical Downlink Control Channel (PDCCH) indicating release of a Semi-Persistent Scheduling (SPS) resource.

Preferably the dedicated feedback timing can satisfy at least one of the following conditions:

(1) The dedicated feedback timing is one of feedback timings supported by an Rel-8 TDD system, for example, one of those in Table 1, and reference can be made to the technical specification TS36.213 for details thereof; and (2) Uplink subframes, in which the feedback information corresponding to the downlink data is transmitted, determined according to the dedicated feedback timing are a subset or all of uplink subframes on the primary carrier, that is, ACK/NACK is fed back according to the dedicated feedback timing in a corresponding feedback subframe which is at least one uplink subframe on the primary carrier.

Preferably the dedicated feedback timing determined by the user equipment 10 can be configured by the network side or can be prescribed; and if the dedicated feedback timing determined by the user equipment 10 is configured by the network side, then the dedicated feedback timing determined by the network-side apparatus 20 is configured for the user equipment 10; or if the dedicated feedback timing determined by the user equipment 10 is prescribed, then the dedicated feedback timing determined by the network-side apparatus 20 is also prescribed, as will be described below respectively.

In a first approach, the dedicated feedback timing is configured by the network side.

Particularly the network-side apparatus 20 configures a dedicated feedback timing for the user equipment 10, and the user equipment 10 determines the dedicated feedback timing configured by the network side.

Where the dedicated feedback timing configured by the network side is the same as a feedback timing corresponding to the primary carrier (that is, the feedback timing corresponding to the primary carrier is configured by the network side for the user equipment 10 as the dedicated feedback timing); or Uplink subframes in a TDD uplink-downlink configuration corresponding to the dedicated feedback timing configured by the network side are a subset or all of uplink subframes on any carrier (which can be any one carrier or can be any more than one carrier) aggregated for the user equipment.

In a second approach, the dedicated feedback timing is prescribed, that is, preconfigured in the user equipment 10 through a protocol.

Particularly the user equipment 10 determines a prescribed dedicated feedback timing, and the network-side apparatus 20 determines the prescribed dedicated feedback timing.

Where the prescribed dedicated feedback timing is the same as a feedback timing corresponding to the primary carrier (that is, the user equipment 10 determines the feedback timing corresponding to the primary carrier as the dedicated feedback timing); or When the feedback timing corresponding to the primary carrier corresponds to the TDD uplink-downlink configuration 0 or 1 or 2 or 6 (see Table 1), the prescribed dedicated feedback timing is the feedback timing corresponding to the TDD uplink-downlink configuration 2, and when the feedback timing corresponding to the primary carrier corresponds to the TDD uplink-downlink configuration 3 or 4 (see Table 1), the prescribed dedicated feedback timing is the feedback timing corresponding to the TDD uplink-downlink configuration 4.

It shall be noted that in either of the approaches, both the network-side apparatus 20 and the user equipment 10 need to use the same dedicated feedback timing which can be particularly prescribed through the protocol or notified of by the network side.

In an implementation, the number of bits of the feedback information can be further determined by the user equipment 10 before sending the feedback information and by the network-side apparatus 20 before receiving the feedback information.

Preferably for transmission of ACK/NACK information corresponding to the downlink data, the size of an ACK/NACK codebook will be determined according to a dedicated ACK/NACK feedback timing.

Particularly the user equipment 10 and the network-side apparatus 20 can determine the number of bits of the feedback information by means of Formula 1 or Formula 2:

$$N = M \times (C + C_{2TB})$$ Formula 1;

Where N is the number of bits of the feedback information, M is the number of subframes, determined according to the dedicated feedback timing, for which the feedback information needs to be transmitted in the same uplink subframe, C is the number of aggregated carriers, and $C_{2TB}$ is the number of carriers for which a multi-codeword transmission mode is configured to be used for the downlink without spatial bundling of the feedback information.

$$N = \sum_{X=0}^{C-1} M_X^{DL} \times TB_X;$$ Formula 2

Where N is the number of bits of the feedback information, $M_X^{DL}$ is the number of downlink subframes among M subframes on a carrier X, determined according to the dedicated feedback timing, for which the feedback information needs to be transmitted in the same uplink subframe, C is the number of aggregated carriers, and if a single-codeword transmission mode is configured to be used for the downlink or spatial bundling of the feedback information is configured on the carrier X, then $TB_X=1$, otherwise $TB_X=2$.

The carrier X is one of the aggregated carriers, and N is the sum of $M_X^{DL} \times TB_X$ of the respective carriers.

Preferably the user equipment can further determine particular feedback information before sending the feedback information. Since all the feedback information for the different carriers needs to be transmitted on the primary carrier, and there are at least two TDD uplink-downlink configurations on the different carriers, it is likely that some subframes correspond to downlink subframes according to the dedicated feedback timing while these subframes are unlink subframes on the carrier or some subframes correspond to uplink subframes according to the dedicated feedback timing while these subframes are downlink subframes on the carrier. These subframes can be preferably handled as follows:

For a carrier with a corresponding TDD uplink-downlink configuration different from the TDD uplink-downlink configuration corresponding to the dedicated feedback timing, the user equipment sends, for a first particular subframe which corresponds to downlink subframe according to the dedicated feedback timing but is uplink subframe on the carrier, the feedback information for the first particular subframe; and For a carrier with a corresponding TDD uplink-downlink configuration different from the TDD uplink-downlink configuration corresponding to the dedicated feedback timing, the user equipment performs, for a second particular subframe which corresponds to uplink subframe according to the dedicated feedback timing but is downlink subframe on the carrier, a particular processing for feedback information corresponding to the second particular subframe.

The user equipment performs the particular processing for the feedback information corresponding to the second particular subframe as follows: for the second particular subframe, the user equipment may not send the feedback information for the second particular subframe; or bundle the feedback information corresponding to the second particular subframe with feedback information of at least one downlink subframe located immediately before or after the second particular subframe and send the bundled feedback information at the position of the feedback information of the at least one downlink subframe located immediately before or after the second particular subframe.

Where the network-side apparatus according to the embodiment of the invention can be a base station (e.g., a macro base station, a home base station, etc.) or can be a Relay Node (RN) apparatus or can be another network-side apparatus.

Processing of the first particular subframe and the second particular subframe will be described below in details by way of several embodiments.

Figure 7:
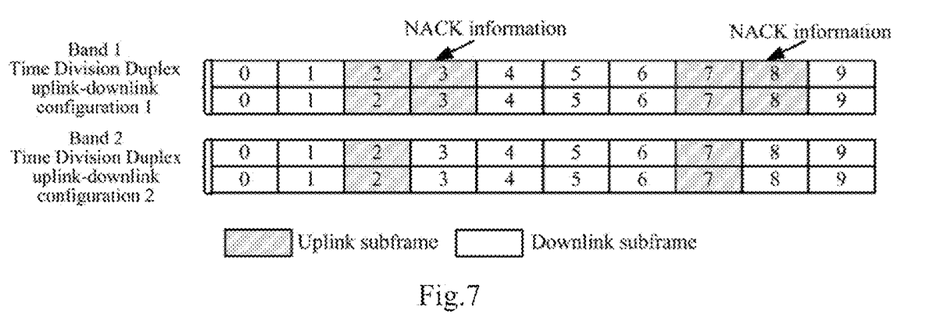
FIG. 7 is a schematic flow chart of first feedback information according to an embodiment of the invention.

In a first embodiment, as illustrated in FIG. 7, the feedback timing corresponding to the TDD uplink-downlink configuration 2 is used as the dedicated feedback timing Carriers with the TDD uplink-downlink configurations 1 and 2 are aggregated for the UE. The UE determines the number of bits of ACK/NACK to be fed back by means of Formula 1 according to the dedicated feedback timing, where although the subframes 3 and 8 in the band 1 are uplink subframes, feedback information corresponding thereto still needs to be generated so as to ensure other bits in a sequence of feedback information to be positioned correctly.

Since there is no feedback information for an uplink subframe, feedback information for an uplink subframe is preferably NACK information but can alternatively be prescribed as ACK. The following embodiments will be described by way of an example with feedback information corresponding to an uplink subframe being NACK information, but the same will apply with the use of ACK, so a repeated description thereof will be omitted.

Referring to FIG. 7, for example, if the number of bits of the feedback information is determined by means of Formula 2, then no feedback information may be generated for the subframes 3 and 8 in the band 1 because the numbers of bits are calculated for the respective carriers and then summed up.

Figure 8:
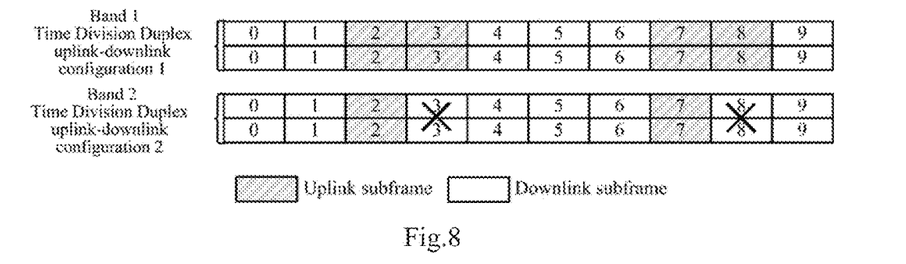
FIG. 8 is a schematic flow chart of second feedback information according to an embodiment of the invention.
Figure 9:
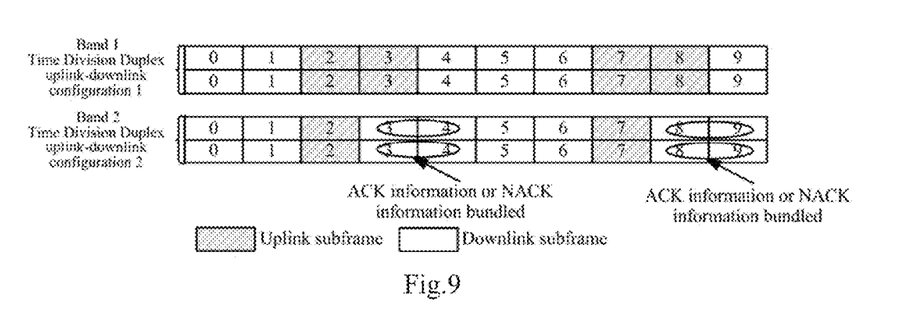
FIG. 9 is a schematic flow chart of third feedback information according to an embodiment of the invention.

In a second embodiment, the feedback timing corresponding to the TDD uplink-downlink configuration 1 is used as the dedicated feedback timing. Carriers with the TDD uplink-downlink configurations 1 and 2 are aggregated for the UE. The UE determines the number of bits of ACK/NACK to be fed back according to the dedicated feedback timing, where there are two processing approach for the second embodiment:

In a first approach, as illustrated in FIG. 8, no ACK/NACK information is fed back for the subframe 3 and the subframe 8 in the band 2.

In a second approach, as illustrated in FIG. 9, ACK/NACK information of the subframe 3 and the subframe 8 in the band 2 is bundled with that of adjacent downlink subframes and then fed back, and the positions of the ACK/NACK information of the adjacent subframes (i.e., the subframe 4 and the subframe 9) are occupied for the bundled ACK/NACK information.

For the second embodiment, the effect of Formula 1 is the same as that of Formula 2.

Figure 10:
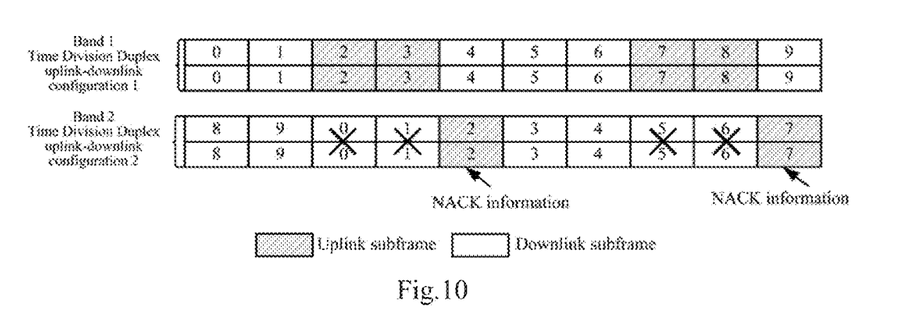
FIG. 10 is a schematic flow chart of fourth feedback information according to an embodiment of the invention.

In a third embodiment, the feedback timing corresponding to the TDD uplink-downlink configuration 1 is used as the dedicated feedback timing. Carriers with the TDD uplink-downlink configurations 1 and 2 are aggregated for the UE but they are not synchronized, that is, numbers of the corresponding subframe are different, across different bands. The UE determines the number of bits of ACK/NACK to be fed back according to the dedicated feedback timing where there are three processing approach for the third embodiment:

In a first approach, as illustrated in FIG. 10, no ACK/NACK information is generated for the subframes 0 and 1 in the band 2; and according to Formula 1, although the subframe 2 in the band 2 is an uplink subframe, NACK information corresponding thereto still needs to be generated, or according to Formula 2, no feedback information may be generated for the subframe 2 in the band 2.

Figure 11:
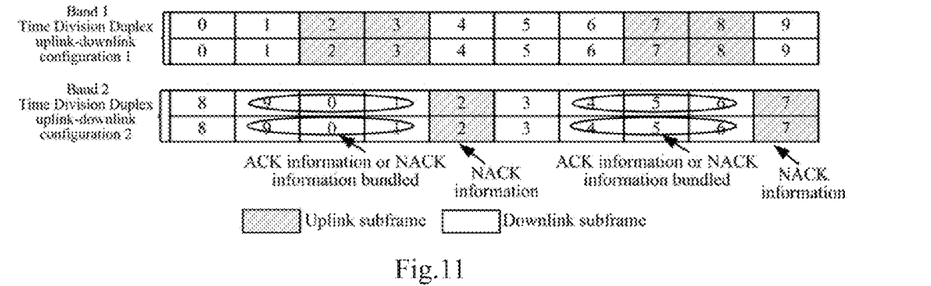
FIG. 11 is a schematic flow chart of fifth feedback information according to an embodiment of the invention.

In a second approach, as illustrated in FIG. 11, ACK/NACK information of the subframe 0 and the subframe 1 in the band 2 is bundled with that of adjacent downlink subframes and then fed back, and the positions of the ACK/NACK information of the adjacent subframes (i.e., the subframe 9) are occupied for the bundled ACK/NACK information; and according to Formula 1, although the subframe 2 in the band 2 is an uplink subframe, NACK information corresponding thereto still needs to be generated, or according to Formula 2, no feedback information may be generated for the subframe 2 in the band 2.

Figure 12:
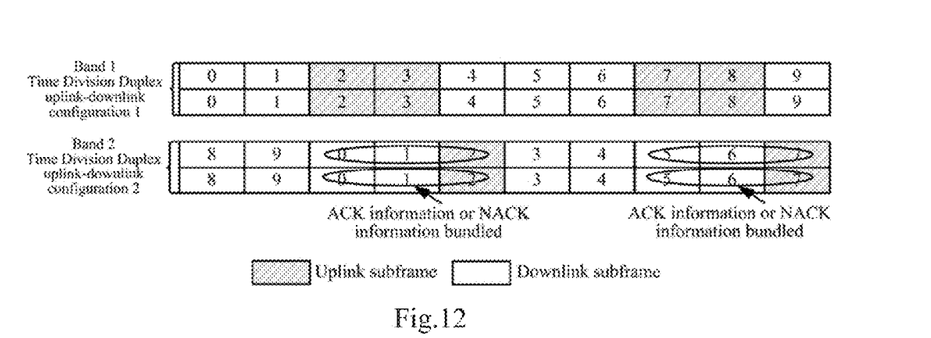
FIG. 12 is a schematic flow chart of sixth feedback information according to an embodiment of the invention.
Figure 13:
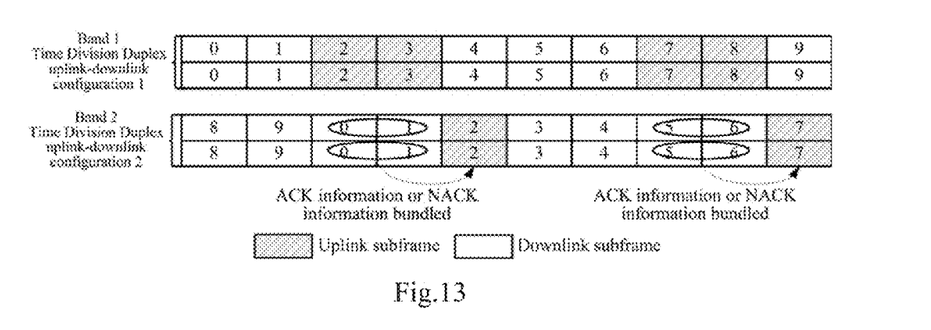
FIG. 13 is a schematic flow chart of seventh feedback information according to an embodiment of the invention.

In a third approach, as illustrated in FIG. 12 and FIG. 13, according to Formula 1, ACK/NACK information of the subframe 0 and the subframe 1 in the band 2 is bundled with that of adjacent uplink subframes and then fed back, and the uplink subframes correspond to downlink subframes in the dedicated feedback timing, where actually the adjacent uplink subframes will not be involved with ACK/NACK bundling but simply the ACK/NACK information corresponding to the subframe 0 and the subframe 1 can be bundled.

It shall be noted that two carriers and the TDD uplink-downlink configurations 1 and 2 have been referred to in the foregoing embodiments, and the same will apply with other numbers of carriers and other TDD uplink-downlink configurations, so a repeated description thereof will be omitted.

Based upon the same inventive concept, embodiments of the invention further provide a user equipment, a network-side apparatus, a method of sending feedback information and a method of receiving feedback information, and since these apparatuses and methods address the problem under a similar principle to the system for transmitting feedback information, reference can be made to the implementation of the system for implementations of these apparatuses and methods, so a repeated description thereof will be omitted.

Figure 3:
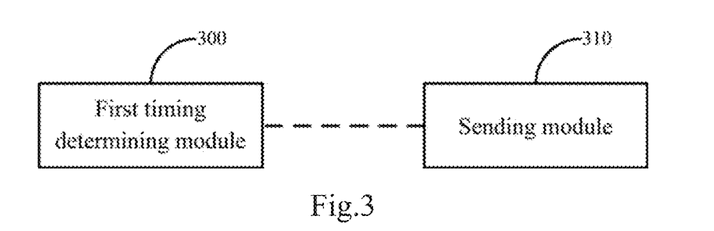
FIG. 3 is a schematic structural diagram of a user equipment according to an embodiment of the invention.

As illustrated in FIG. 3, a user equipment according to an embodiment of the invention which is configured with carrier aggregation with different TDD uplink-downlink configurations particularly includes a first timing determining module 300 and a sending module 310.

The first timing determining module 300 is configured to determine a dedicated feedback timing; and The sending module 310 is configured to send feedback information, corresponding to downlink data, on a primary carrier according to the determined dedicated feedback timing Preferably the first timing determining module 300 determines a dedicated feedback timing configured by the network side.

Where a feedback timing corresponding to the primary carrier is determined by the network side as the dedicated feedback timing, or uplink subframes in a TDD uplink-downlink configuration corresponding to the dedicated feedback timing configured by the network side are a subset or all of uplink subframes on any aggregated carrier of the user equipment.

Preferably the first timing determining module 300 determines a prescribed dedicated feedback timing.

Where a feedback timing corresponding to the primary carrier is prescribed to be used as the dedicated feedback timing, or when the feedback timing corresponding to the primary carrier corresponds to the TDD uplink-downlink configuration 0 or 1 or 2 or 6, a feedback timing corresponding to the TDD uplink-downlink configuration 2 is prescribed to be used as the dedicated feedback timing, and when the feedback timing corresponding to the primary carrier corresponds to the TDD uplink-downlink configuration 3 or 4, a feedback timing corresponding to the TDD uplink-downlink configuration 4 is prescribed to be used as the dedicated feedback timing.

Preferably the first timing determining module 300 determines the number of bits of the feedback information by means of Formula 1 or Formula 2.

Preferably for a carrier with a corresponding TDD uplink-downlink configuration different from the TDD uplink-downlink configuration corresponding to the dedicated feedback timing, the first timing determining module 300 sends, for a first particular subframe which corresponds to downlink subframe according to the dedicated feedback timing but is uplink subframe on the carrier, the feedback information for the first particular subframe.

Preferably for a carrier with a corresponding TDD uplink-downlink configuration different from the TDD uplink-downlink configuration corresponding to the dedicated feedback timing, the first timing determining module 300 performs, for a second particular subframe which corresponds to uplink subframe according to the dedicated feedback timing but is downlink subframe on the carrier, a particular processing for feedback information corresponding to the second particular subframe.

Preferably the first timing determining module 300 performs the particular processing for the feedback information corresponding to the second particular subframe particularly by not sending the feedback information for the second particular subframe or by bundling the feedback information corresponding to the second particular subframe with feedback information of at least one downlink subframe located immediately before or after the second particular subframe and sending the bundled feedback information at the position of the feedback information of the at least one downlink subframe located immediately before or after the second particular subframe.

Figure 4:
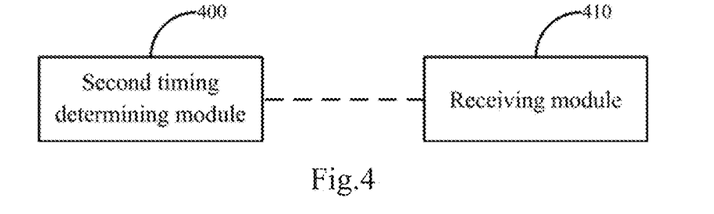
FIG. 4 is a schematic structural diagram of a network-side apparatus according to an embodiment of the invention.

As illustrated in FIG. 4, a network-side apparatus according to an embodiment of the invention includes a second timing determining module 400 and a receiving module 410.

The second timing determining module 400 is configured to determine a dedicated feedback timing; and The receiving module 410 is configured to receive feedback information from a user equipment, which is configured with carrier aggregation with different TDD uplink-downlink configurations, on a primary carrier of the user equipment according to the determined dedicated feedback timing.

Preferably the second timing determining module 400 configures the dedicated feedback timing for the user equipment.

Where the configured dedicated feedback timing is the same as a feedback timing corresponding to the primary carrier, or uplink subframes in a TDD uplink-downlink configuration corresponding to the configured dedicated feedback timing are a subset or all of uplink subframes on any aggregated carrier of the user equipment.

Preferably the second timing determining module 400 determines a prescribed dedicated feedback timing.

Where a feedback timing corresponding to the primary carrier is prescribed to be used as the dedicated feedback timing, or when the feedback timing corresponding to the primary carrier corresponds to the TDD uplink-downlink configuration 0 or 1 or 2 or 6, a feedback timing corresponding to the TDD uplink-downlink configuration 2 is prescribed to be used as the dedicated feedback timing, and when the feedback timing corresponding to the primary carrier corresponds to the TDD uplink-downlink configuration 3 or 4, a feedback timing corresponding to the TDD uplink-downlink configuration 4 is prescribed to be used as the dedicated feedback timing.

Preferably the second timing determining module 400 determines the number of bits of the feedback information by means of Formula 1 or Formula 2.

Figure 5:
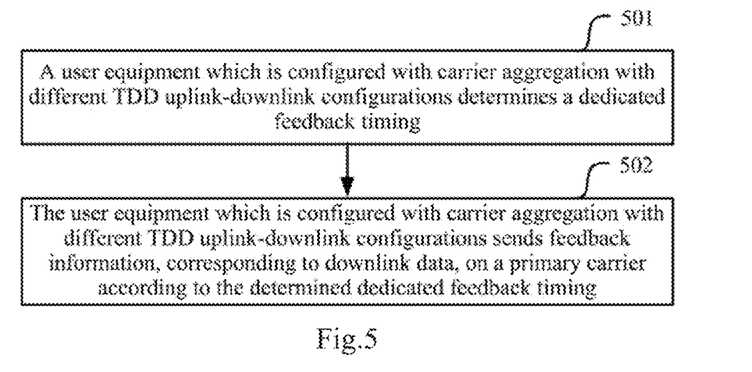
FIG. 5 is a schematic flow chart of a method of sending feedback information according to an embodiment of the invention.

As illustrated in FIG. 5, a method of sending feedback information according to an embodiment of the invention includes the following steps:

Step 501. A user equipment which is configured with carrier aggregation with different TDD uplink-downlink configurations determines a dedicated feedback timing; and Step 502. The user equipment which is configured with carrier aggregation with different TDD uplink-downlink configurations sends feedback information, corresponding to downlink data, on a primary carrier according to the determined dedicated feedback timing Preferably the dedicated feedback timing can satisfy at least one of the following conditions:

(1) The dedicated feedback timing is one of feedback timings supported by an Rel-8 TDD system, for example, one of those in Table 1; and (2) Uplink subframes, in which the feedback information corresponding to the downlink data is transmitted, determined according to the dedicated feedback timing are a subset or all of uplink subframes on the primary carrier, that is, ACK/NACK is fed back according to the dedicated feedback timing in a corresponding feedback subframe which is at least one uplink subframe on the primary carrier.

Preferably in the step 501, the dedicated feedback timing determined by the user equipment can be configured by the network side or can be prescribed, as will be described below respectively.

In a first approach, the dedicated feedback timing is configured by the network side.

Particularly the user equipment determines a dedicated feedback timing configured by the network side.

Where a feedback timing corresponding to the primary carrier is configured by the network side as the dedicated feedback timing; or uplink subframes in a TDD uplink-downlink configuration corresponding to the dedicated feedback timing configured by the network side are a subset or all of uplink subframes on any carrier (which can be any one carrier or can be any more than one carrier) aggregated for the user equipment.

In a second approach, the dedicated feedback timing is prescribed.

Particularly the user equipment determines a prescribed dedicated feedback timing.

Where a feedback timing corresponding to the primary carrier is prescribed to be used as the dedicated feedback timing; or when the feedback timing corresponding to the primary carrier corresponds to the TDD uplink-downlink configuration 0 or 1 or 2 or 6 (see Table 1), the feedback timing corresponding to the TDD uplink-downlink configuration 2 is prescribed to be used as the dedicated feedback timing, and when the feedback timing corresponding to the primary carrier corresponds to the TDD uplink-downlink configuration 3 or 4 (see Table 1), the feedback timing corresponding to the TDD uplink-downlink configuration 4 is prescribed to be used as the dedicated feedback timing.

It shall be noted that in either of the approaches, both the network-side apparatus and the user equipment need to use the same dedicated feedback timing which can be particularly prescribed through a protocol or notified of by the network side.

In an implementation, the user equipment can further determine the number of bits of the feedback information before the step 502.

Preferably for transmission of ACK/NACK information corresponding to the downlink data, the size of an ACK/NACK codebook will be determined according to a dedicated ACK/NACK feedback timing.

Particularly the user equipment can determine the number of bits of the feedback information by means of Formula 1 or Formula 2.

The user equipment and the network-side apparatus need to determine the number of bits of the feedback information in the same formula.

It is likely that some subframes correspond to downlink subframes according to the dedicated feedback timing while these subframes are unlink subframes on the carrier or some subframes correspond to uplink subframes according to the dedicated feedback timing while these subframes are downlink subframes on the carrier. These subframes can be preferably handled as follows: before the step 502, for a carrier with a corresponding TDD uplink-downlink configuration different from the TDD uplink-downlink configuration corresponding to the dedicated feedback timing, the user equipment sends, for a first particular subframe which corresponds to downlink subframe according to the dedicated feedback timing but is uplink subframe on the carrier, the feedback information for the first particular subframe; and For a carrier with a corresponding TDD uplink-downlink configuration different from the TDD uplink-downlink configuration corresponding to the dedicated feedback timing, the user equipment performs, for a second particular subframe which corresponds to uplink subframe according to the dedicated feedback timing but is downlink subframe on the carrier, a particular processing for feedback information corresponding to the second particular subframe.

The step that the user equipment performs the particular processing for the feedback information corresponding to the second particular subframe includes: for the second particular subframe, the user equipment may not send the feedback information for the second particular subframe; or bundle the feedback information corresponding to the second particular subframe with feedback information of at least one downlink subframe located immediately before or after the second particular subframe and send the bundled feedback information at the position of the feedback information of the at least one downlink subframe located immediately before or after the second particular subframe.

Figure 6:
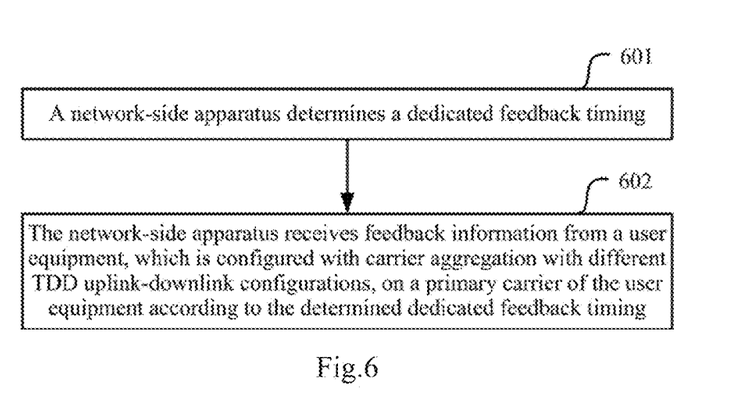
FIG. 6 is a schematic flow chart of a method of receiving feedback information according to an embodiment of the invention.

As illustrated in FIG. 6, a method of receiving feedback information according to an embodiment of the invention includes the following steps:

Step 601. A network-side apparatus determines a dedicated feedback timing; and Step 602. The network-side apparatus receives feedback information from a user equipment, which is configured with carrier aggregation with different TDD uplink-downlink configurations, on a primary carrier of the user equipment according to the determined dedicated feedback timing.

Preferably the dedicated feedback timing can satisfy at least one of the following conditions:

(1) The dedicated feedback timing is one of feedback timings supported by an Rel-8 TDD system, for example, one of those in Table 1; and (2) Uplink subframes, in which the feedback information corresponding to the downlink data is transmitted, determined according to the dedicated feedback timing are a subset or all of uplink subframes on the primary carrier, that is, ACK/NACK is fed back according to the dedicated feedback timing in a corresponding feedback subframe which is at least one uplink subframe on the primary carrier.

Preferably the dedicated feedback timing determined by the network-side apparatus can be configured for the user equipment or can be prescribed, as will be described below respectively.

In a first approach, the dedicated feedback timing is configured by the network side.

Particularly the network-side apparatus configures a dedicated feedback timing for the user equipment.

Where the dedicated feedback timing configured by the network side is the same as a feedback timing corresponding to the primary carrier; or uplink subframes in a TDD uplink-downlink configuration corresponding to the dedicated feedback timing configured by the network side are a subset or all of uplink subframes on any aggregated carrier of the user equipment.

In a second approach, the dedicated feedback timing is prescribed.

Particularly the network-side apparatus determines a prescribed dedicated feedback timing Where a feedback timing corresponding to the primary carrier is prescribed to be used as the dedicated feedback timing; or When the feedback timing corresponding to the primary carrier corresponds to the TDD uplink-downlink configuration 0 or 1 or 2 or 6 (see Table 1), the feedback timing corresponding to the TDD uplink-downlink configuration 2 is prescribed to be used as the dedicated feedback timing, and when the feedback timing corresponding to the primary carrier corresponds to the TDD uplink-downlink configuration 3 or 4(see Table 1), the feedback timing corresponding to the TDD uplink-downlink configuration 4 is prescribed to be used as the dedicated feedback timing.

It shall be noted that in either of the approaches, both the network-side apparatus and the user equipment need to use the same dedicated feedback timing which can be particularly prescribed through a protocol or notified of by the network side.

In an implementation, the network-side apparatus can further determine the number of bits of the feedback information before the step 602.

Particularly the network-side apparatus can determine the number of bits of the feedback information by means of Formula 1 or Formula 2.

Where FIG. 5 and FIG. 6 can be combined into a flow of a method of transmitting feedback information, that is, firstly the steps 501 and 601, then the step 502 and finally the step 602 are performed.

The step 501 and the step 601 may not necessarily be performed in an exact sequential order, that is, if the dedicated feedback timing is configured by the network side, then firstly the step 601 and then the step 501 are performed; or if the dedicated feedback timing is preconfigured, then firstly the step 501 and then the step 601 can be performed, or firstly the step 601 and then the step 501 can be performed, or the step 501 and the step 601 can be performed concurrently.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Since feedback information is enabled to be transmitted following aggregation of carriers with different TDD uplink-downlink configurations, the transmission efficiency and the system performance following aggregation of the carriers with the different TDD uplink-downlink configurations can be improved.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of sending feedback information, comprising:

determining, by a user equipment, a dedicated feedback timing; and     sending, by the user equipment, feedback information, corresponding to downlink data, on a primary carrier according to the determined dedicated feedback timing, wherein the user equipment is a user equipment which is configured with carrier aggregation with different Time Division Duplex (TDD) uplink-downlink configurations, and wherein the dedicated feedback timing is one of feedback timings supported by a Release 8 Long Term Evolution (Rel-8 LTE) TDD system;

wherein before the user equipment sends the feedback information, the method further comprises a step of:

determining the number of bits of the feedback information by means of Formula 2 of:

$$N = \sum_{X=0}^{C-1} M_X^{DL} \times TB_X, \qquad \text{Formula 2}$$

wherein N is the number of bits of the feedback information, $M_X^{DL}$ is the number of downlink subframes among M subframes on a carrier X, determined according to the dedicated feedback timing, for which the feedback information needs to be transmitted in a same uplink subframe, C is the number of aggregated carriers, and if a single-codeword transmission mode is configured for downlink or spatial bundling of the feedback information is configured on the carrier X, then $TB_X=1$, otherwise $TB_X=2$.

2. The method according to claim 1, wherein uplink subframes, in which the feedback information corresponding to the downlink data is transmitted, determined according to the dedicated feedback timing are a subset or all of uplink subframes on the primary carrier.

3. The method according to claim 1, wherein the determining, by the user equipment, a dedicated feedback timing comprises:
determining, by the user equipment, a dedicated feedback timing configured by a network side,
wherein the dedicated feedback timing configured by the network side is the same as a feedback timing corresponding to the primary carrier, or uplink subframes in a TDD uplink-downlink configuration corresponding to the dedicated feedback timing configured by the network side are a subset or all of the uplink subframes on any aggregated carrier of the user equipment.

4. The method according to claim 1, wherein the determining, by the user equipment, a dedicated feedback timing comprises:
determining, by the user equipment, a prescribed dedicated feedback timing,
wherein a feedback timing corresponding to the primary carrier is prescribed to be used as the dedicated feedback timing, or when the primary carrier is configured with TDD uplink-downlink configuration 0 or 1 or 2 or 6, a feedback timing corresponding to TDD uplink-downlink configuration 2 is prescribed to be used as the dedicated feedback timing, and when the primary carrier is configured with TDD uplink-downlink configuration 3 or 4, a feedback timing corresponding to TDD uplink-downlink configuration 4 is prescribed to be used as the dedicated feedback timing,
wherein TDD uplink-downlink configurations 0, 1, 2, 3, 4 and 6 are defined by LTE TDD.

5. A method of receiving feedback information, comprising:
determining, by a network-side apparatus, a dedicated feedback timing; and
receiving, by the network-side apparatus, feedback information from a user equipment on a primary carrier of the user equipment according to the determined dedicated feedback timing,
wherein the user equipment is a user equipment which is configured with carrier aggregation with different Time Division Duplex (TDD) uplink-downlink configurations, and wherein the dedicated feedback timing is one of feedback timings supported by a Release 8 Long Term Evolution (Rel-8 LTE) TDD system;
wherein before the network-side apparatus receives the feedback information, the method further comprises a step of:
determining the number of bits of the feedback information by means of Formula 2 of:

$$N = \sum_{X=0}^{C-1} M_X^{DL} \times TB_X, \qquad \text{Formula 2}$$

wherein N is the number of bits of the feedback information, $M_X^{DL}$ is the number of downlink subframes among M subframes on a carrier X, determined according to the dedicated feedback timing, for which the feedback information needs to be transmitted in a same uplink subframe, C is the number of aggregated carriers, and if a single-codeword transmission mode is configured for downlink or spatial bundling of the feedback information is configured on the carrier X, then $TB_X=1$, otherwise $TB_X=2$.

6. The method according to claim 5, wherein uplink subframes, in which the feedback information corresponding to the downlink data is transmitted, determined according to the dedicated feedback timing are a subset or all of uplink subframes on the primary carrier.

7. The method according to claim 5, wherein before the network-side apparatus receives the feedback information, the method further comprises:
configuring, by the network-side apparatus, a dedicated feedback timing for the user equipment,
wherein the configured dedicated feedback timing is the same as a feedback timing corresponding to the primary carrier, or uplink subframes in a TDD uplink-downlink configuration corresponding to the configured dedicated feedback timing are a subset or all of the uplink subframes on any aggregated carrier of the user equipment.

8. The method according to claim 5, wherein the determining, by the network-side apparatus, a dedicated feedback timing comprises:
determining, by the network-side apparatus, a prescribed dedicated feedback timing,
wherein a feedback timing corresponding to the primary carrier is prescribed to be used as the dedicated feedback timing, or when the primary carrier is configured with TDD uplink-downlink configuration 0 or 1 or 2 or 6, a feedback timing corresponding to TDD uplink-downlink configuration 2 is prescribed to be used as the dedicated feedback timing, and when the feedback timing corresponding to the primary carrier corresponds to TDD uplink-downlink configuration 3 or 4, a feedback timing corresponding to TDD uplink-downlink configuration 4 is prescribed to be used as the dedicated feedback timing,
wherein the TDD uplink-downlink configurations 0, 1, 2, 3, 4, and 6 are defined by LTE TDD.

9. An apparatus for sending feedback information, the apparatus, which is configured with carrier aggregation with different Time Division Duplex (TDD) uplink -downlink configurations, comprising at least one processor and at least one storage unit, wherein the at least one storage unit stores program instructions executable by the at least one processor to implement:
a first timing determining module configured to determine a dedicated feedback timing; and a sending module configured to send feedback information, corresponding to downlink data, on a primary carrier according to the determined dedicated feedback timing, wherein the dedicated feedback timing is one of feedback timings supported by a Release 8 Long Term Evolution (Rel-8 LTE) TDD system;

wherein the first timing determining module is further configured:

to determine the number of bits of the feedback information by means of Formula 2 of:

$$N = \sum_{X=0}^{C-1} M_X^{DL} \times TB_X, \quad \text{Formula 2}$$

wherein N is the number of bits of the feedback information, $M_X^{DL}$ is the number of downlink subframes among M subframes on a carrier X, determined according to the dedicated feedback timing, for which the feedback information needs to be transmitted in a same uplink subframe, C is the number of aggregated carriers, and if a single-codeword transmission mode is configured t for downlink or spatial bundling of the feedback information is configured on the carrier X, then $TB_X=1$, otherwise $TB_X=2$.

10. The apparatus according to claim 9, wherein the first timing determining module is further configured:

to determine a dedicated feedback timing configured by the network side, wherein the dedicated feedback timing configured by the network side is the same as a feedback timing corresponding to the primary carrier, or uplink subframes in a TDD uplink-downlink configuration corresponding to the dedicated feedback timing configured by the network side are a subset or all of the uplink subframes on any aggregated carrier of the apparatus.

11. The apparatus according to claim 9, wherein the first timing determining module is further configured:

to determine a prescribed dedicated feedback timing, wherein a feedback timing corresponding to the primary carrier is prescribed to be used as the dedicated feedback timing, or when the primary carrier is configured with TDD uplink-downlink configuration 0 or 1 or 2 or 6, a feedback timing corresponding to the TDD uplink-downlink configuration 2 is prescribed to be used as the dedicated feedback timing, and when the primary carrier is configured with TDD uplink-downlink configuration 3 or 4, a feedback timing corresponding to TDD uplink-downlink configuration 4 is prescribed to be used as the dedicated feedback timing, wherein TDD uplink-downlink configurations 0, 1, 2, 3, 4, and 6 are defined by LTE TDD.

* * * * *